United States Patent [19]

Ueno et al.

[11] Patent Number: 5,267,805
[45] Date of Patent: Dec. 7, 1993

[54] SYNTHETIC RESIN BALL JOINT WITH METAL REINFORCING RING

[75] Inventors: Atsushi Ueno, Fujisawa; Tatsuyoshi Tsuji, Aichi; Masataka Tagami, Toyohashi; Kenji Yamada, Fujisawa, all of Japan

[73] Assignees: Musashi Seimitsu Kogyo Company Limited, Toyohashi; Oiles Corporation, Tokyo, both of Japan

[21] Appl. No.: 808,117

[22] Filed: Dec. 16, 1991

[51] Int. Cl.5 .............................. F16C 11/06
[52] U.S. Cl. .................... 403/134; 403/132; 403/133
[58] Field of Search ............... 403/132, 133, 134, 135, 403/56; 280/674, 689

[56] References Cited

U.S. PATENT DOCUMENTS 5,067,841 11/1991 Fukukawa .................. 403/135 X
5,092,703 3/1992 Kobayashi ................... 403/122

FOREIGN PATENT DOCUMENTS 1432903 2/1966 France ........................ 403/134

Primary Examiner—Randolph A. Reese
Assistant Examiner—G. Spisich
Attorney, Agent, or Firm—Armstrong, Westerman, Hattori, McLeland & Naughton

[57] ABSTRACT

A synthetic with an opening at the top and a concave spherical surface extending from the opening, where a ball head of a ball stud is fixed, has a circular concave step on the outer surface of the housing surround the opening. A metal ring is fixed on the circular step so that the strength of the opening of the synthetic resin housing in a radial inward direction is greatly increased to resist the pull-out load on the ball stud. Warping of the opening is thereby prevented.

18 Claims, 4 Drawing Sheets

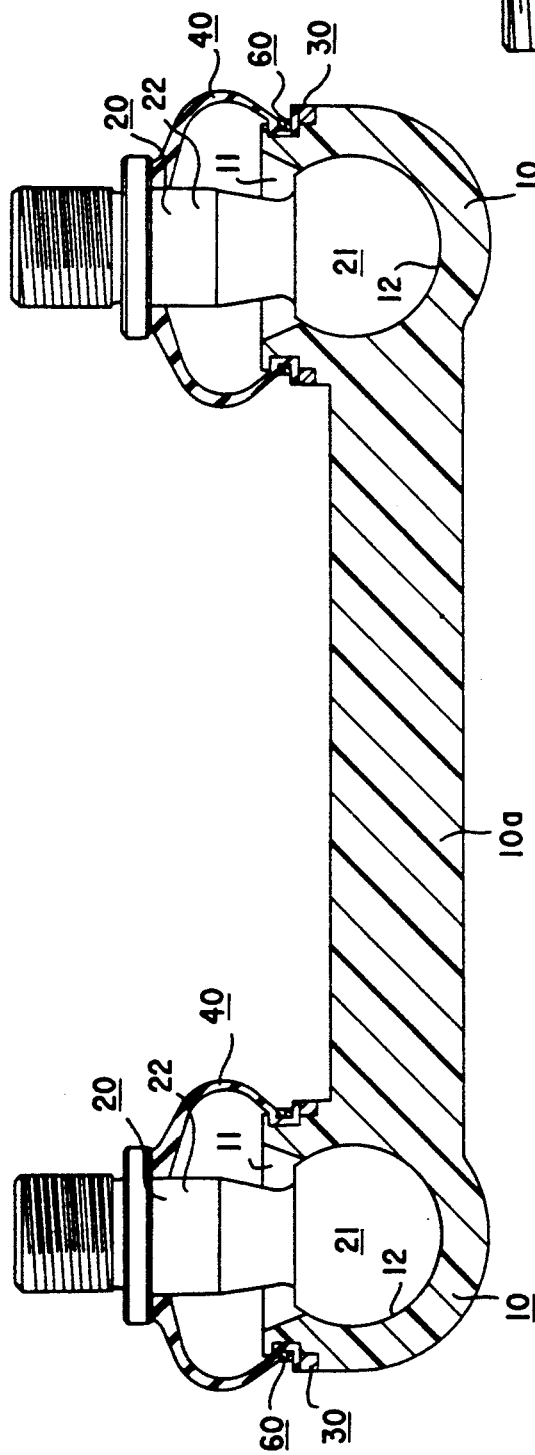
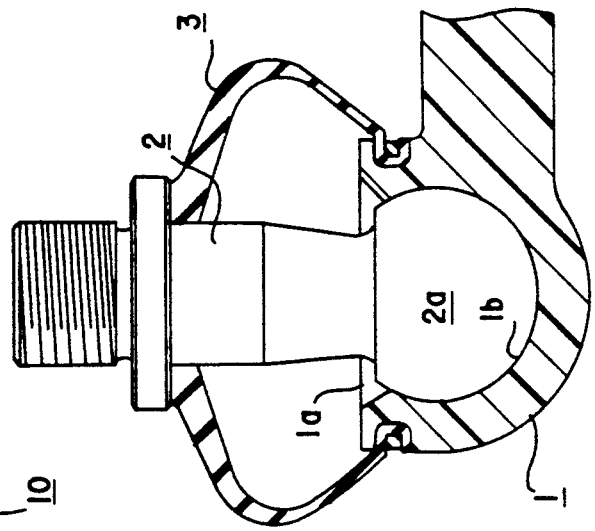
Fig.7
Fig.8 PRIOR ART

SYNTHETIC RESIN BALL JOINT WITH METAL REINFORCING RING

BACKGROUND OF THE INVENTION

1. Field of the Invention

This invention relates to a ball joint (automobile stabilizer, for connecting a stabilizer rotatably installed on the automobile body, to a suspension arm).

The purpose of an automobile stabilizer is to increase the stability of the automobile by creating a resistant force for counteracting a rolling motion of an automobile body such as during sharp turning of the automobile. The stabilizer has a U-shape torsion bar spring installed between a suspension arm and the automobile body to compensate for vertical vibration. Generally, the center part of the U-shaped bar is used as the torsion bar spring and is rotatably connected to the automobile body via a rubber cushion or rubber bush. Each end of the U-shaped bar is connected to a suspension arm through the ball joint.

2. Description of the Related Art

As shown in FIG. 8, a synthetic resin housing 1 of the ball joint used for various automobile linkages in the present technology has an opening 1a at the top and a concave spherical surface 1b extending from the opening 1a, which is designed to serve as a seat. The ball head 2a of the ball stud 2 is secured therein. U.S. Pat No. 3,409,318 and U.S. Pat. No. 4,388,012 are examples of this type of ball joint. A dust seal 3 is also shown in FIG. 8.

In such a ball joint, the concave spherical surface 1b of the housing 1 is designed to be a supporting surface for the ball head 2a of the ball stud 2, and the ball head 2a of the ball stud 2 is to be pressed onto the concave spherical surface 1b through the opening 1a of the housing 1. For this reason, the diameter of the opening 1a of the housing cannot be much smaller than the diameter of ball head 2a. Consequently, the strength for preventing ball stud 2 from being pulled out is low.

SUMMARY OF THE INVENTION

An object of the present invention is to increase the holding strength of the synthetic resin housing of the ball joint to prevent the ball stud from pulling out of its socket.

In the first embodiment, a synthetic resin housing has an opening at the top and a concave spherical surface extending from the opening. A ball head of a ball stud comprising a stud part and the ball part, is fixed with the stud part projecting through the opening of the resin housing. On the outside circular surface of the rim of the opening of the synthetic resin housing, a circular step is formed, where a metal ring is fixed to increase the strength of the opening in its diametrical direction. As such, the strength against the pulling out load on the ball stud is increased, which thus prevents the opening from expanding or warping.

In the second embodiment of the present invention, the synthetic resin housing has a circular groove which is continued from the circular step. One side of a dust seal is fitted on the groove, whereas the other side of the seal is fixed on the outside surface of the ball stud. This arrangement helps to resist any pulling out force exerted on the ball stud as in the first embodiment, since expansion of the opening is prevented.

In addition, the side of the dust seal fitted within the groove is fixed there by a tightening clip. The outside diameter of the clip is larger than the inside diameter of the metal ring fixed on the circular step, so that the clip prevents the metal ring from slipping off in the direction of the stud. In this arrangement, the tightening clip plays the role of a stopper which prevents the metal ring fitted on the circular step from coming off in the direction of the stud part of a ball stud. The tightening clip works as a stopper even when there is an opening between the metal ring and the circular step caused by shrinkage of the housing due to stress alleviation. Also, the dust seal prevents water from coming into the opening between the metal ring and the circular step.

Finally, in the third embodiment, male screw threadings are formed on the outside surface of the vertical cylindrical area of a circular notch. A cylindrical metal ring, which has a circular flange and female screw threads formed on an inside surface, is screwed onto the threaded outside surface of the cylindrical part of the housing member. On the outer surface of the opening of the housing, is a circular concave groove which consists of a circular flange part and a vertical outside surface of the cylindrical metal ring and the circular bottom surface of the step. One end of the dust seal is fixed in the circular concave groove, while the other end is fixed on the outside surface of the stud part to help resist any pulling out load on the ball stud. Since the strength of the opening at the top of the synthetic resin housing is increased by the metal ring, expansion of the opening is also prevented.

Although stress relaxation will be caused by the influence of thermal hysteresis, even when the opening is between the female screw part of the cylindrical metal ring and the male screw part of the outer surface of the opening of the housing, the connecting part of those two screws is tightened toward the axial direction of the ball stud so that the cylindrical metal ring will not be pulled out. Furthermore, as a labyrinth seal is formed at the connecting part in this case, rain or other water will not come into the ball joint through the opening.

A BRIEF DESCRIPTION OF THE DRAWINGS

This invention may be better understood and its numerous objects and advantages will become apparent to those skilled in the art by reference to the accompanying drawings as follows:

FIG. 7 is a longitudinal sectional plan which shows another example of the practical usage of the ball joint of the present invention; and FIG. 8 is a longitudinal section of a conventional ball joint.

DETAILED DESCRIPTION OF THE PREFERRED EMBODIMENTS

In order to demonstrate the inventions, the following examples are set forth for the purpose of illustration only. Any specific enumeration mentioned herein should not be interpreted as a limitation of the invention.

Figure 1:
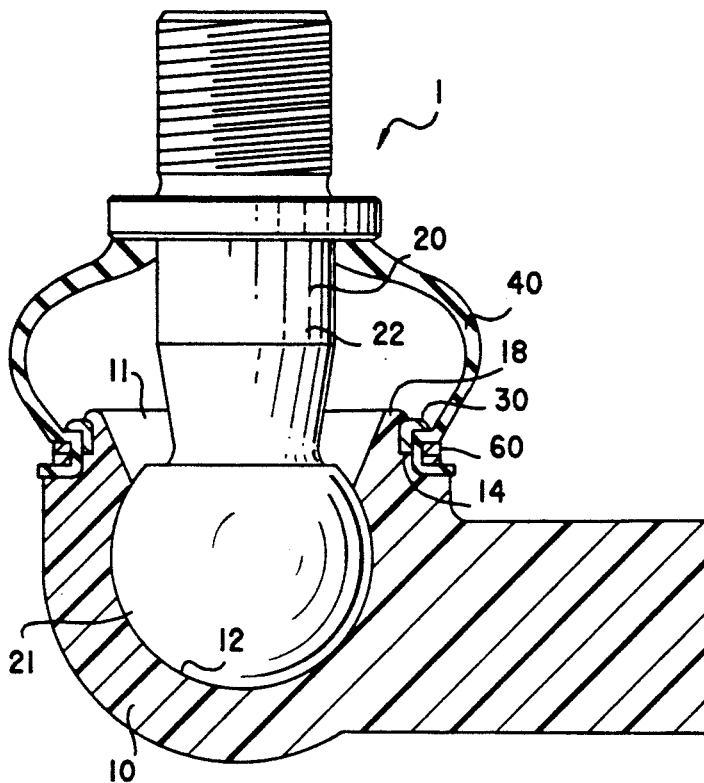
FIG. 1 is a longitudinal sectional plan which shows the first embodiment of the ball joint of the present invention.
Figure 2:
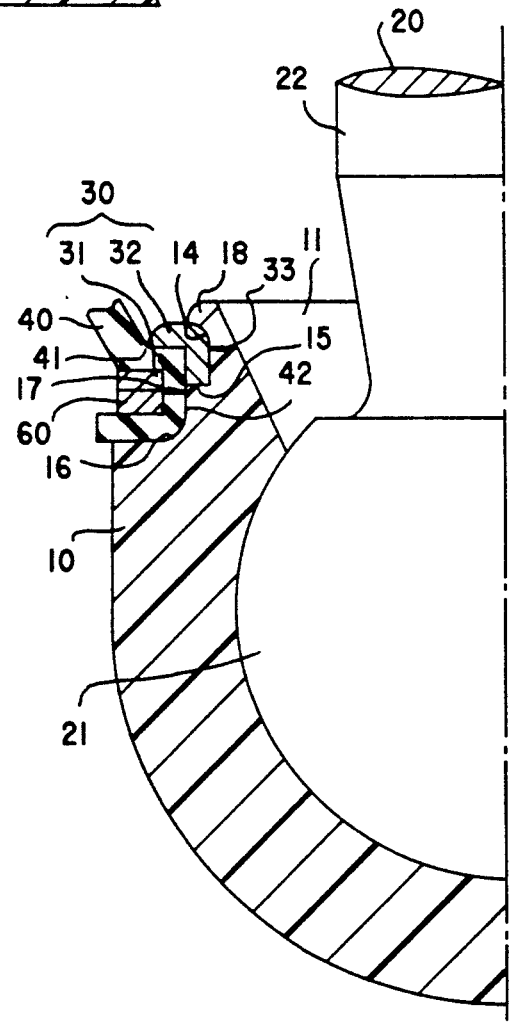
FIG. 2 is an enlarged partially longitudinal sectional plan of FIG. 1.

Referring initially to FIGS. 1 and 2, the first embodiment of the ball joint of the present invention is shown. The synthetic resin housing 10 in FIG. 1 has an opening 11 at the top and a concave spherical surface 12 extending from the opening 11 on the inside of the housing 10. Materials useable as the synthetic resin for the housing should have suitable elasticity and excellent selflubricity. Polyacetal resin, polyamide resin, thermoplastic polyester are a few examples.

On the outside circular surface of rim 18 of the opening 11 of the synthetic resin housing 10, a first circular step 14 is formed where the metal ring 30 is fitted for preventing deformation. As shown in FIG. 2, which is an enlarged drawing of a portion of FIG. 1, the synthetic resin housing 10 also has a second circular step 16 which is adjacent to the first circular step 14. The diameter 17 of the vertical surface of the second step 16 is larger than the diameter of the vertical surface 15 of the first circular step 14.

The ball stud member 20 has a ball head 21 and a stud part 22. The diameter of the ball head 21 is larger than the diameter of the opening of the synthetic resin housing. Dust seal 40 is made of an elastic rubber material. One end of the dust seal is fixed on the outside surface of the stud part 22 of the ball stud member 20, and the other larger side 41 is fixed in the groove which consists of the metal ring 30 and the circular step 16. This larger end 41 of the dust seal 40 is tightened by clip 60. The tightening clip 60 is made of a spring steel wire rod of the flat cross section. As the spring steel is densely coiled to form the clip, a spring force passes inwardly in a radial direction.

Following are details of the area of the opening 11 of the synthetic resin housing 10 of the ball joint:

The metal ring 30, the cross section of which is a hookshape, consists of a cylindrical part 31 stretching in an axial direction of the ball joint 1, and a flange part 32 extending from one end of the cylindrical part 31 to its outside diametrical direction. The flange part 32 prevents the dust seal 40 from being pulled out in the pulling-out direction of the ball stud 20. The inside surface 33 of the cylindrical part 31 contacts the bottom surface 15 of first circular step 14 of the synthetic resin housing 10. The diameter of the inside circular surface 33 of cylindrical part 31 of ring 30 is formed smaller than the outside diameter of the rim of the opening 11 of the synthetic resin housing 10; therefore, once the metal ring 30 is fixed in the circular groove, even if a pulling out load is exerted on ball stud 20, the ring does not come off because it catches on the rim part 18. Also, even when the pulling-out load is exerted on the ball stud 20, the metal ring 30 prevents the rim part of the opening 11 from transforming in the pulling-out direction or the outside diametrical direction, because the ring is made of metal. As such, the synthetic resin housing 10 has a sufficient holding capacity against a pull-out load on ball stud 20 so that the ball stud will not be pulled out from the synthetic resin housing 10.

Moreover, because the inside spherical surface 42 of the larger end of the dust seal 40 is contacted not only on the outside surface of the cylindrical part of the metal ring 30, but also on the vertical circular surface of the step 17 of the synthetic resin housing, and because the larger end 41 is tightened there by the tightening clip 60, a decreasing of sealing capacity at the opening 11 of the housing 10 due to setting the metal ring 30 can be prevented.

Figure 4:
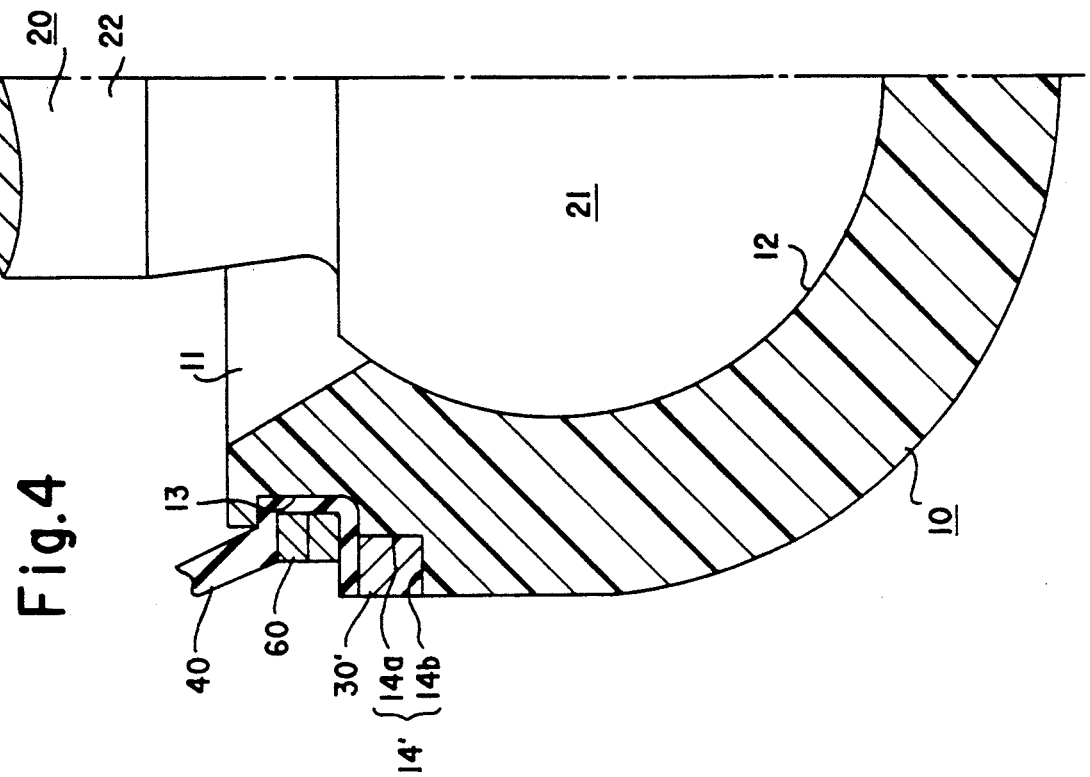
FIG. 4 is an enlarged partially longitudinal sectional plan of FIG. 3.
Figure 3:
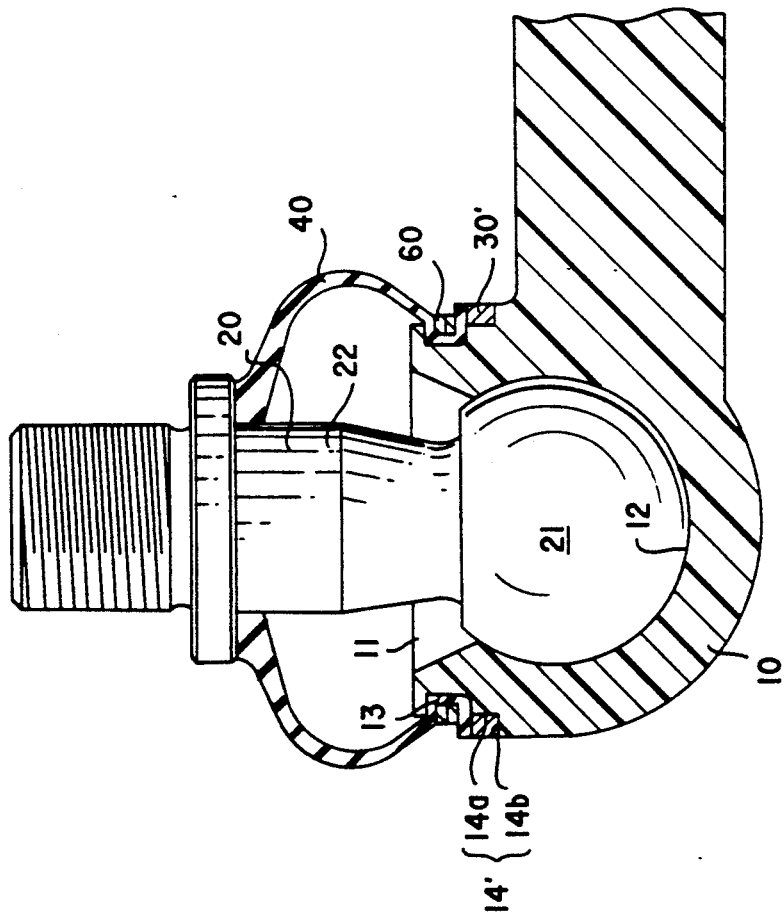
FIG. 3 is a longitudinal sectional plan which shows the second embodiment of the ball joint of the present invention.

As can be seen in FIGS. 3 and 4, a second embodiment of the ball joint is shown wherein the synthetic resin housing 10 has an opening 11 at the top, and the concave spherical surface 12 extends from the opening 11, on the inside of the housing. A circular groove 13 is formed at the top of the outside surface of the housing 10 adjacent to circular step 14' which comprises a vertical cylindrical area 14a and a circular bottom part 14b.

The ball stud member 20 consists of the ball head 21 and the stud part 22 formed with the ball head as a unity. The outside diameter of the ball head is formed to be larger than the diameter of the opening 11 of the housing 10. The ball head 21 of the ball stud 20 is to be inserted into the housing 10 through the opening 11 so as to fit the ball head 21 on the concave spherical surface 12 with the stud part projecting outside through opening 11.

The cylindrical metal ring 30' is fixed both on the vertical surface 14a and on the bottom surface 14b of the circular step 14'. It is not desirable to allow too large an interference between the inside diameter of the metal ring 30' and the outside diameter of the vertical surface 14a of the circular step 14' when the ring is pressed on the circular step. If the interference is too large, it will affect the concave spherical surface, and the designed torque between the concave spherical surface 12 and the ball head 21 on the concave spherical surface will be undesirably affected.

The dust seal 40 is made of an elastic rubber material. One end of the dust seal is fixed on the outside surface of the stud part 22 of the ball stud member 20, and the other end is fixed in the circular concave groove 13 of the housing 10. The tightening clip 60 helps the dust seal 40 remain fixed in the circular concave groove 13.

The tightening clip is made from a steel spring wire rod of flat cross section. The outside diameter of the clip 60 is formed to be larger than the inside diameter of the metal ring 30'. The steel spring is densely coiled to make the clip for a greater spring force in the inside radial direction. The tightening clip 60, fixed on one end of the dust seal 40 in the concave groove, is placed with its outside surface extending beyond the inside surface of the metal ring fitted in the circular step 14'. More specifically, the center of the tightening clip 60 can be placed directly above the vertical contact area between the metal ring 30' and the circular step 14'.

In this arrangement, the tightening clip 60 plays the role of a stopper which prevents metal ring 30' fitted on the circular step 14' from coming off in the direction of the stud part of the ball stud. The tightening clip 60 works as a stopper even when there is an opening between the metal ring 30' and the circular step 14 caused by shrinkage of the housing 10 due to stress alleviation. In addition, even if there is an opening between the metal ring 30' and the circular step 14, the opening is covered by the dust seal 40 so that rain and other water will not come into the opening.

Figure 6:
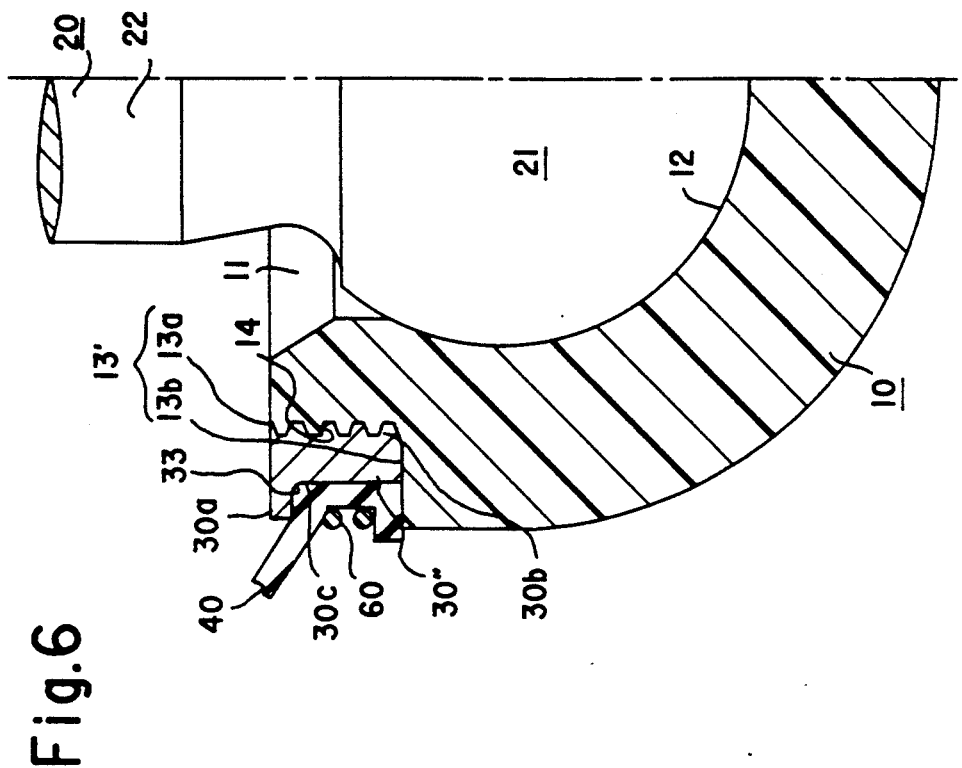
FIG. 6 is an enlarged partially longitudinal sectional plan of FIG. 5.
Figure 5:
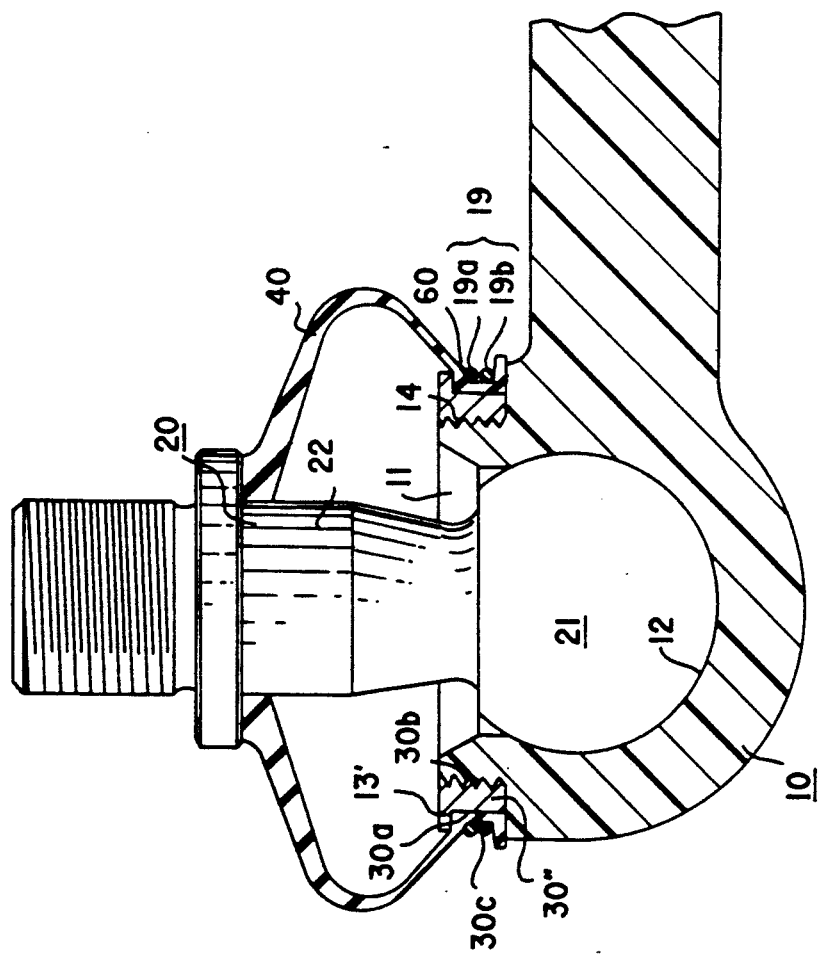
FIG. 5 is a longitudinal sectional plan which shows the third embodiment of the ball joint of the present invention.

Referring now to FIGS. 5 and 6, a third embodiment of the ball joint of the present invention is shown. A synthetic resin housing 10 in FIG. 5 has an opening 11 at the top and a concave spherical surface 12 extending from the opening 11, on the inside of the housing. A circular notch 19 is formed at the top of the outside surface of the housing 10, which consists of a vertical cylindrical area 19a where male screw threadings are formed, and a circular bottom part 19b.

The ball stud member 20, as in FIGS. 3 and 4, consists of a ball head 21 formed integrally with a stud part 22. The outside diameter of the ball head is formed to be larger than the diameter of the opening 11 of the housing 10. The ball stud 20 is to be inserted int the housing 10 through the opening 11 so as to fit the ball head 21 on the concave spherical surface 12 with the stud part 22 projecting outside through the opening.

The cylindrical metal ring 30'', which has a circular flange 30a and female screw threads formed on its inside surface, is screwed onto the outside surface of the cylindrical part 19a of the housing member where the male screw threads are formed as mentioned above. The circular concave groove 13' which is on the outer surface of the opening of the housing 10 consists of the circular flange part 30a, a vertical outside surface 30c of the cylindrical metal ring 30'', and a circular bottom surface 19b of the groove 19.

The dust seal 40 is made of elastic rubber material. One end of the dust seal 40 is fixed on the outside surface of the stud part 22 of the ball stud member 20, and the other end is fixed in the circular concave groove 13' formed on the outside surface of the opening 11 of the housing. Tightening clip 60 helps the dust seal 40 remain fixed in the circular concave groove 13'.

In the ball joints explained above, the strength of the opening 11 at the top of the synthetic resin housing 10 in a diametrical direction is increased by the cylindrical metal ring 30'' screwed onto the circular notch 19. When a pulling-out load is placed on the ball joint, the ring will add resistance to the ball and the ball head will be prevented from being pulled out from the concave spherical surface.

Although stress relaxation can be used by the influence of thermal hysteresis, even when there is an opening between the female screw part 30b of the cylindrical metal ring 30'' and the male screw part 19a of the outer surface of the opening 11 of the housing, the connecting part of the two screw parts is tightened in an axial direction of the ball stud so that the cylindrical metal ring 30 will not be pulled out. Furthermore, as a labyrinth seal is formed at the connecting part, rain or other water will not enter into the ball joint through any such opening.

Finally, FIG. 7 shows another example of the ball joint of the present invention. In this example, a housing 10 for each of the ball joints is formed at each side of, and integrally with a synthetic resin rod 10a. This type of the ball joint is especially suitable for a stabilizer of an automobile.

It is understood that various other modifications will be apparent and can be readily made by those skilled in the art without departing from the scope and spirit of this invention. Accordingly, it is not intended that the scope of the claims appended hereto be limited to the description as set forth herein, but rather that the claims be construed as encompassing all of the features of patentable novelty that reside in the present invention, including all features that would be treated as equivalents thereof by those skilled in the art to which this invention pertains.

What is claimed is:

1. A ball joint comprising:
    a synthetic resin housing having an opening at the top;
    a concave spherical surface extending from the opening;
    a ball stud comprising a ball head and a stud part, wherein the ball head is pivotally fixed within said concave spherical surface and the stud part projects through the opening;
    a circular concave step formed in the synthetic resin housing proximate to the outer edge of the opening; and
    a metal ring fixed within the circular concave step.

2. The ball joint of claim 1, further comprising:
    a circular concave groove disposed adjacent the circular concave step; and
    a dust seal wherein one end of the dust seal is fixed within said circular concave groove, and the other end is fixed on an outside surface of the stud part of the ball stud.

3. The ball joint of claim 2, further comprising:
    a tightening clip for fixing one end of the dust seal within the circular concave groove, wherein the outside diameter of the tightening clip is larger than the inside diameter of the metal ring fitted on the circular step so that the metal ring is prevented from moving in the direction of the stud part of the ball stud.

4. The ball joint of claim 3, wherein the center of said tightening clip is directly above the contact point between a vertical surface of said circular step and said metal ring.

5. The ball joint of claim 3, wherein said one end of said dust seal is disposed in a hook shape adjacent a vertical surface of said circular groove, a circular bottom surface of said circular groove, and said metal ring.

6. The ball joint of claim 3, wherein said tightening clip is a steel spring wire rod of flat cross section.

7. The ball joint of claim 2, wherein the diameter of a vertical surface of said circular concave groove is larger than the diameter of a vertical surface of said circular concave step.

8. The ball joint of claim 7, further comprising a tightening clip fixedly securing said one end of said dust seal within said circular concave groove.

9. The ball joint of claim 8, wherein said metal ring is disposed adjacent said vertical surface of said circular concave step, and said one end of said dust seal is secured by said tightening clip adjacent said vertical surface of said circular concave groove.

10. The ball joint of claim 8, wherein said one end of said dust seal is disposed in a hook shape adjacent a circular bottom surface of said circular concave groove, said vertical surface of said circular concave groove, and said metal ring.

11. The ball joint of claim 2, wherein said circular concave groove is defined by a circular top surface, a vertical surface, and a circular bottom surface.

12. The ball joint of claim 1, further comprising:
    a second synthetic resin housing integrally connected to said first resin housing via a synthetic resin rod, the second synthetic resin housing having an opening at the top;
    a second concave spherical surface extending from the opening;
    a second ball stud comprising a ball head and a stud part, wherein the ball head is pivotally fixed within said second concave spherical surface and the stud part projects through the opening;

a second circular concave step on the outer surface of the opening of the second housing; and a second ring fixed on the second circular concave step.

13. The ball joint of claim 1, wherein said synthetic resin housing is selected from the group consisting of polyacetal resin, polyamide resin, and thermoplastic polyester.

14. A ball joint comprising:

a synthetic resin housing having an opening at the top;

a concave spherical surface extending from the opening;

a ball stud comprising a ball head and a stud part, wherein the ball head is pivotally fixed within said concave spherical surface and the stud part projects through the opening;

a circular notch formed in the synthetic resin housing proximate to the outer edge of the opening; and male screw threadings on an outside surface of a vertical area of the circular notch;

a metal ring fixed within the circular notch;

wherein said metal ring is a cylindrical metal ring having female screw threads formed on an inside surface, the ring being screwed onto the threaded outside surface of the vertical cylindrical area.

15. The ball joint of claim 14, wherein said metal ring has a circular flange extending radially outwardly.

16. The ball joint of claim 15, further comprising a circular concave groove formed by said circular flange of said metal ring, a vertical outside surface of said metal ring, and a circular bottom surface of said circular notch.

17. The ball joint of claim 16, further comprising a dust seal, wherein one end of the dust seal is fixed within said circular concave groove, and the other end is fixed on an outside surface of the stud part of the ball stud.

18. The ball joint of claim 17, further comprising a tightening clip fixedly securing said one end of said dust seal within said circular concave groove.

* * * * *